United States Patent
Wang

(10) Patent No.: US 9,366,797 B2
(45) Date of Patent: Jun. 14, 2016

(54) SIDE TYPE BACKLIGHT MODULE, METHOD FOR PRODUCING THE SAME AND DISPLAY APPARATUS

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 14/316,266

(22) Filed: Jun. 26, 2014

(65) Prior Publication Data
US 2015/0234112 A1 Aug. 20, 2015

(30) Foreign Application Priority Data
Feb. 14, 2014 (CN) .......................... 2014 1 0050612

(51) Int. Cl.
*F21V 8/00* (2006.01)

(52) U.S. Cl.
CPC ............ *G02B 6/0028* (2013.01); *G02B 6/0021* (2013.01); *G02B 6/0026* (2013.01); *G02B 6/0031* (2013.01); *G02B 6/0051* (2013.01); *G02B 6/0065* (2013.01); *G02B 6/0073* (2013.01); *G02B 6/0085* (2013.01); *Y10T 29/49826* (2015.01)

(58) Field of Classification Search
CPC ........... F21V 9/15; F21K 2/00; G02B 6/0013; G02B 6/00; G02B 6/003; G02B 6/0021; G02B 6/0026; G02B 6/0028
USPC ................. 362/97.3, 606, 231, 612, 613, 230
See application file for complete search history.

(56) References Cited

U.S. PATENT DOCUMENTS

| 7,484,873 B2 * | 2/2009 | Dejima ................. | G02B 6/002 362/606 |
| 2006/0002678 A1 * | 1/2006 | Weber .................. | G02B 6/0008 385/146 |
| 2012/0281166 A1 * | 11/2012 | Iwasaki ................ | G02B 6/0041 349/65 |

FOREIGN PATENT DOCUMENTS

| CN | 1740846 A | 3/2006 |
| CN | 101315484 A | 12/2008 |

(Continued)

OTHER PUBLICATIONS

The First Office Action issued by SIPO on Jul. 2, 2015 in corresponding Chinese Application No. 201410050612.1, with the English translation, 13 pages.

(Continued)

*Primary Examiner* — Anabel Ton
(74) *Attorney, Agent, or Firm* — Kinney & Lange, P.A.

(57) ABSTRACT

The present disclosure relates to the technical file of display, in particular to a side type backlight module, a method for producing the same and a display apparatus. The backlight module comprises: a LED source; a light guide plate; a wedge-shaped light guide portion located between the LED source and the light guide plate; two reflectors having reflective faces located on a top and a bottom of the wedge-shaped light guide portion and inclined with respect to an upper surface or a lower surface of the light guide plate, for adjusting the light emitting angle of the LED source; and a silicon gel part located between the LED source and the wedge-shaped light guide portion. With the inclined reflectors arranged on the top and the bottom of the silicon gel part, the present disclosure may avoid the light leak, improve the optical efficiency and suppress the light leak and hot spots effects of the light incident end of the light guide plate.

12 Claims, 7 Drawing Sheets

(56) References Cited

FOREIGN PATENT DOCUMENTS

| CN | 102338297 A | 2/2012 |
| CN | 203036420 U | 7/2013 |

OTHER PUBLICATIONS

Second Chinese Office Action and English translation dated Dec. 24, 2015, for corresponding Chinese Application No. 201410050612.1.

* cited by examiner

SIDE TYPE BACKLIGHT MODULE, METHOD FOR PRODUCING THE SAME AND DISPLAY APPARATUS

CROSS-REFERENCE TO RELATED APPLICATION

This application claims the benefit of Chinese Patent Application No. 201410050612.1 filed on Feb. 14, 2014 in the State Intellectual Property Office of China, the whole disclosure of which is incorporated herein by reference.

BACKGROUND OF THE INVENTION

1. Field of the Invention

Embodiments of the present invention relate to a technical field of display, more particularly, to a side type backlight module, a method for producing the same and a display apparatus.

2. Description of the Related Art

At present, a backlight module may form an air layer between a white light-emitting diode (LED) module and a light guide plate. This air layer may cause a light from LED to produce Fresnel reflection light loss both in the process of exiting the LED module and in the process of entering the light guide plate. In order to avoid the above issue, as illustrated in FIG. 1, the inventor has developed a backlight module in which a silicon gel layer is provided between an light emitting face of the LED module and an light incident face of the light guide plate, which can eliminated the loss of the light emitted from the LED module produced before it enters the light guide plate.

With the silicon gel layer filled between the white LED module and the light guide plate, the light will enter the light guide plate without hindrance. However, in such backlight module, the light emitted from the LED module is incident on a light incident face of the light guide plate at a large angle and will be transmitted out of an edge of the light incident face of the light guide plate without being reflected in total. Thus, the light emitted out of the light guide plate causes light loss. In addition, the light emitted from the LED source may tend to generate hot spot effects in a straight travel region corresponding to the LED in the LED module; further, as a blue light emitted from the LED cannot be reflected in total by the surface of the LED module, the blue light will produce blue shift effects in the silicon gel layer, which causes a great deal of blue light to directly enter the light guide plate such that the light flux of the blue light in the light guide plate can be increased greatly.

SUMMARY OF THE INVENTION

In order to alleviate the above or other issues, the present disclosure provides a side type backlight module, a method for producing the same and a display apparatus that may suppress the light leak and hot spot effects at the incident end of the light guide plate efficiently and improve the optical efficiency of the light source.

According to an embodiment of an aspect of the present invention, it provides a side type backlight module, comprising: a LED source; a light guide plate; a wedge-shaped light guide portion located between the LED source and the light guide plate; two reflectors having reflective faces located on a top and a bottom of the wedge-shaped light guide portion and inclined with respect to an upper surface or a lower surface of the light guide plate, for adjusting the light emitting angle of the LED source; and a silicon gel part located between the LED source and the wedge-shaped light guide portion.

According to an embodiment of another aspect of the present invention, it provides a display apparatus comprising a side type backlight module, the side type backlight module comprising: a LED source; a light guide plate; a wedge-shaped light guide portion located between the LED source and the light guide plate; two reflectors having reflective faces located on a top and a bottom of the wedge-shaped light guide portion and inclined with respect to an upper surface or a lower surface of the light guide plate, for adjusting the light emitting angle of the LED source; and a silicon gel part located between the LED source and the wedge-shaped light guide portion.

According to an embodiment of a further aspect of the present invention, it provides a method for producing a side type backlight module, comprising: forming a wedge-shaped light guide portion at an incident end of the light guide plate; providing reflectors on two inclined surfaces of the wedge-shaped light guide portion, the reflectors having reflective faces inclined with respect to an upper surface or a lower surface of the light guide plate; forming a notch at an incident end face of the wedge-shaped light guide portion; forming a silicon gel part by filling the notch with silicon gel; and mounting a LED source on the silicon gel part.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENTS OF THE INVENTION

Figure 1:
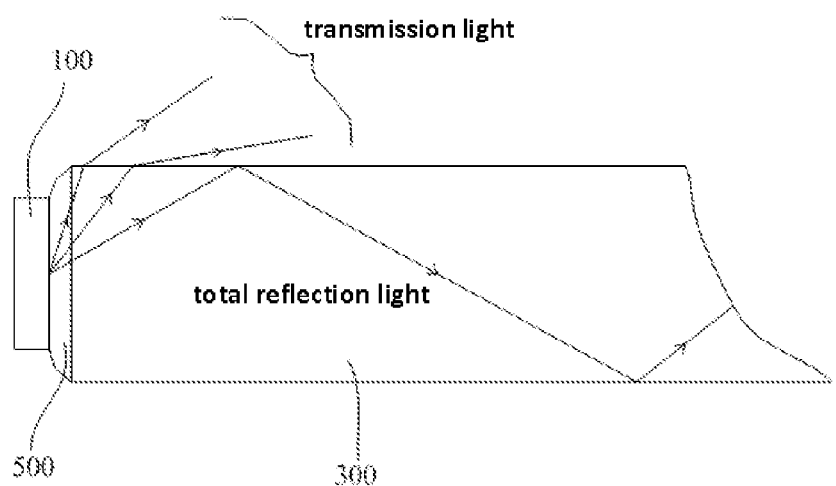
FIG. 1 is a schematic longitudinal sectional view of a backlight module in the prior art as known by the inventor.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In accordance with a general concept of the present invention, it provides a side type backlight module, comprising: a LED source for emitting light; a light guide plate; a wedge-shaped light guide portion located between the LED source and the light guide plate; two reflectors having reflective faces located on a top and a bottom of the wedge-shaped light guide portion and inclined with respect to an upper surface or a lower surface of the light guide plate, for adjusting the light emitting angle of the LED source; and a silicon gel part located between the LED source and the wedge-shaped light guide portion.

Figure 2:
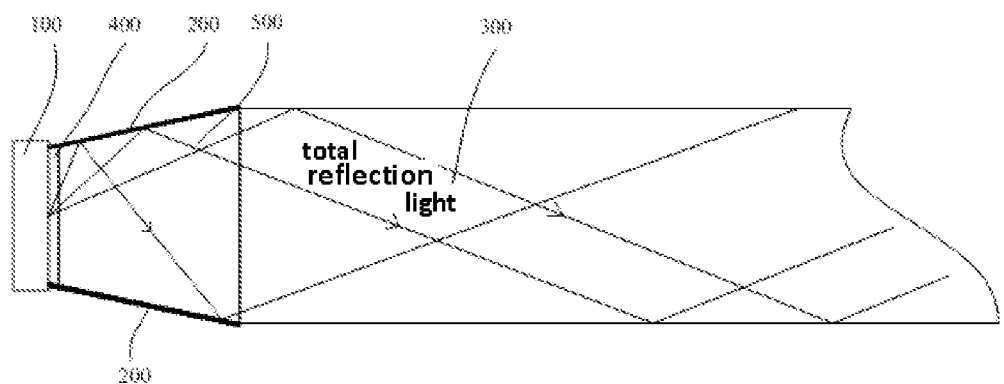
FIG. 2 is a schematic longitudinal sectional view of a backlight module according to a first exemplary embodiment of the present invention.

As illustrated in FIG. 2, the side type backlight module according to the first exemplary embodiment of the present invention, comprises: a LED source 100 for emitting light; a light guide plate 300; and a silicon gel part 500 located between the LED source 100 and the light guide plate 300. In the backlight module of the present embodiment, the silicon gel part has a section with a substantially wedge shape, for example, trapezoid, in the longitudinal direction (a left-right direction of FIG. 2). That is, in the present embodiment, the silicon gel part and the wedge-shaped light guide portion may be made from silicon gel material in single piece. On other words, the silicon gel part may be used as the wedge-shaped light guide portion. The side type backlight module may further comprise two reflectors 200 having reflective faces located on both a top and a bottom of the wedge-shaped light guide portion (i.e., the silicon gel part 500) and inclined with respect to an upper surface or a lower surface of the light guide plate 300, for adjusting the light emitting angle of the LED source 100. For example, the reflectors 200 made of reflective sheets are adhered to the top and the bottom inclined faces of the silicon gel part 500 to form the reflective faces from the LED source 100 to the light guide plate 300.

In the backlight module of the present embodiment, by providing reflectors with inclined reflective faces on both the top and the bottom of the silicon gel part, the light leakage at sides of the silicon gel part may be prevented, improving the optical efficiency and to suppress the light leakage and hot spot effects at the incident end of the light guide plate efficiently. The light with a large emitting angle emitted from the LED source is corrected in direction to enter the light guide plate after being reflected by the reflective faces of the reflectors such that the light may be propagated by total reflection in the light guide plate.

Further, a light emitting face of the LED source 100 may be provided with a fluorescent powder layer 400. With the fluorescent powder layer 400, the blue light emitted from the LED source 100 can be converted into white light to eliminate blue shift effects in the light guide plate 300. In an exemplary embodiment, the fluorescent powder layer 400 may be made from yellow fluorescent powder or a mixture of red fluorescent powder and green fluorescent powder.

Figure 3:
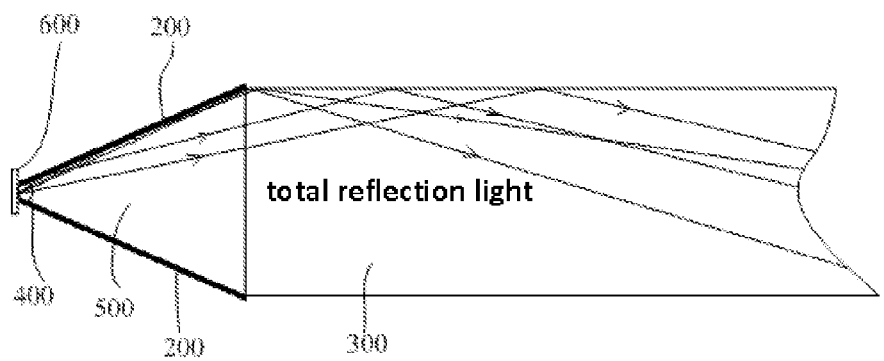
FIG. 3 is a schematic longitudinal sectional view of a backlight module according to a second exemplary embodiment of the present invention.

FIG. 3 is a schematic longitudinal sectional view of a backlight module according to a second exemplary embodiment of the present invention. As illustrated in FIG. 3, the LED source 100 may be made of a blue light LED chip 600 with relatively small size. With the blue light ELD chip 600 used directly as a light source, the fluorescent powder layer 400, for example a yellow fluorescent powder layer, is formed on a light exiting face of the blue light LED chip, for converting the blue light into the white light so as to achieve an integrated package module of the backlight source. Further, the blue LED chip is provided with a heat radiation layer (heat sink) on another side opposed to the light guide plate 300 to allow the blue light LED chip to dissipate heat efficiently. Due to a relatively small size of the blue light LED chip 600, the reflectors 200 made of the reflective sheets on the silicon gel part 500 may have a larger inclination angle, as shown in FIG. 3. In this way, the light emitted from the blue light LED chip 600 may be converted into total reflection light to avoid light leak effects. Meanwhile, as the reflective faces of the reflectors 200 have relatively large inclined angles with respect to the top and bottom surfaces of the light guide plate 300, the light will be propagated at further decreased angle and apt to be parallel in the light guide plate, and thus the light loss may be reduced, improving the optical efficiency. In the backlight module according to the second embodiment shown in FIG. 3, the silicon gel part 500 has the section with a substantially wedge shape, for example, trapezoid, in the longitudinal direction. And the silicon gel part and the wedge-shaped light guide portion are made from silicon gel material in single piece.

Figure 4:
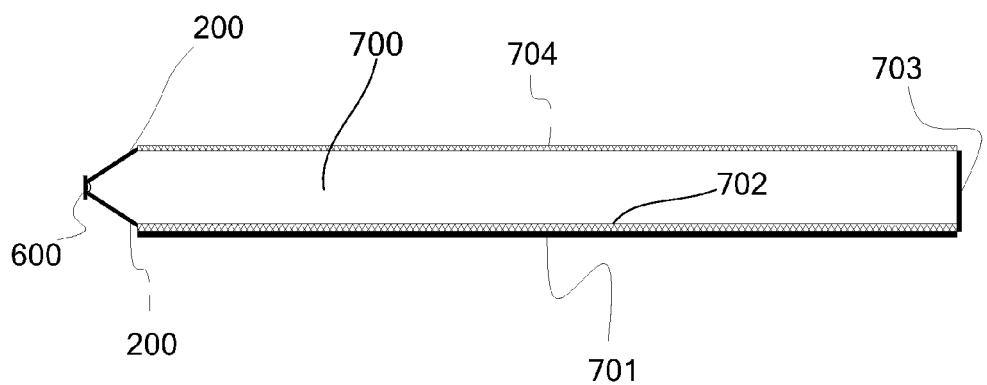
FIG. 4 is a schematic longitudinal sectional view of a backlight module according to a third exemplary embodiment of the present invention.

FIG. 4 is a schematic longitudinal sectional view of a backlight module according to a third exemplary embodiment of the present invention. As illustrated in FIG. 4, the embodiment provides an integrally filled backlight module, in which the light guide plate 700, the wedge-shaped light guide portion and the silicon gel part are made from silicon gel material in single piece. That is, the silicon gel part is used as the wedge-shaped light guide portion by itself. The silicon gel part is arranged at an incident end of the light guide plate 700. The silicon gel part is communicated with the inside of the light guide plate and they are both made from silicon gel material. The backlight module with such structure may simplify the process of packaging the light guide plate.

In the backlight module as shown in FIG. 4, the light guide plate 700 is provided with a top scattering sheet 704 on its top, and the light guide plate 700 is provided with a bottom reflective sheet 701 on its bottom. A bottom scattering sheet 702 is provided on an inner side surface of the bottom reflective sheet 701. That is, the bottom scattering sheet 702 is provided between an inner side surface of the bottom reflective sheet 701 and the bottom of the light guide plate 700. A boundary reflective sheet 703 is provided on a side of the light guide plate 700. The LED source may use the blue light LED chip 600 which emits the light reflected by the reflective faces of the reflectors 200 made of the reflective sheets and inclined with respect to the upper surface or the lower surface of the light guide plate to achieve uniform backlight. The light entering the light guide plate 700 is illuminated on the bottom scattering sheet 702 to form a uniform light distribution. The bottom reflective sheet 701 reflects the light scattered downwardly in the light guide plate 700 back upwardly to reuse the light.

Figure 7:
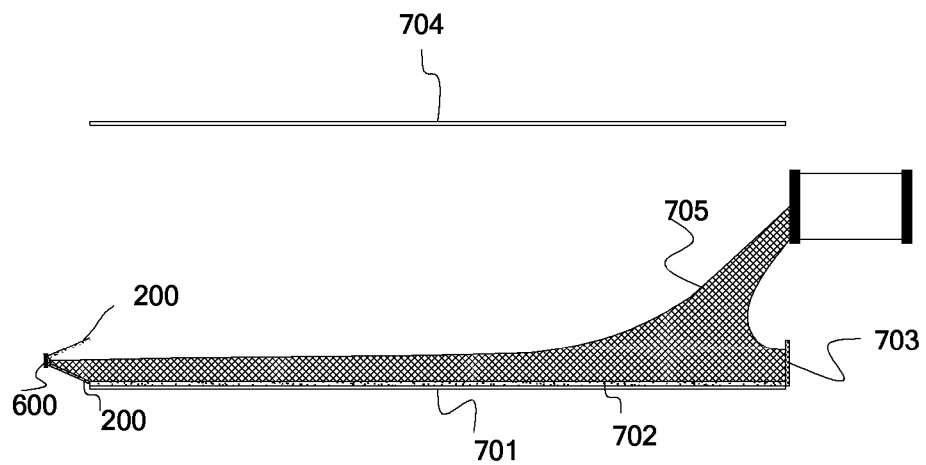
FIG. 7 is a schematic principle view showing a method of producing the backlight module as shown in FIG. 4.

According to an embodiment of a further aspect of the present invention, it also provides a method for producing an integrally backlight module. The method comprises steps of:

as illustrated in FIG. 7, forming a cavity opened upwards by the LED source, two reflectors 200, the bottom reflective sheets 701, the bottom scattering sheets 702 arranged on the top surface of the bottom reflective sheets 701 and the boundary reflective sheet 703, wherein the LED source may comprise a heat radiation layer (heat sink) and the blue light LED chip 600; as illustrated in FIG. 7, filling the cavity with silicon gel 705; after the cavity has been full of the silicon gel 705, mounting an upper scattering sheet 704 on the top of the cavity to form the integrally filled backlight module.

Figure 5:
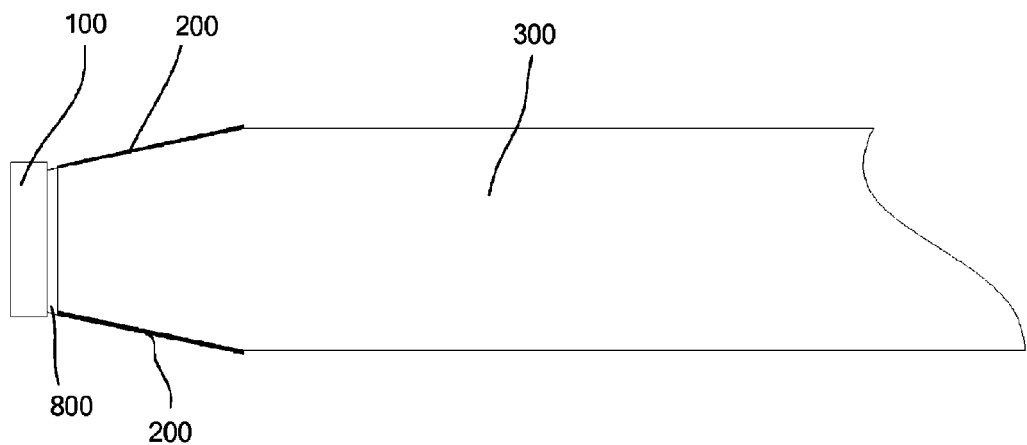
FIG. 5 is a schematic longitudinal sectional view of a backlight module according to a fourth exemplary embodiment of the present invention.

FIG. 5 is a schematic longitudinal sectional view of a backlight module according to a fourth exemplary embodiment of the present invention. As shown in FIG. 5, the backlight module comprises the LED source 100, the light guide plate 300 and the silicon gel part 800 located between the LED source 100 and the light guide plate 300. In the present embodiment, the light guide plate 300 and the wedge-shaped light guide portion are made from optical conductive material, such as glass, in single piece. A top and a bottom at the incident end of the light guide plate 300 are inclined with respect to the top and bottom surfaces of the body of the light guide plate 300 directly, respectively, to form the wedge-shaped light guide portion. The reflectors 200 made of the reflective sheets are provided on the top and bottom inclined surfaces of the wedge-shaped light guide portion, respectively.

Figure 6:
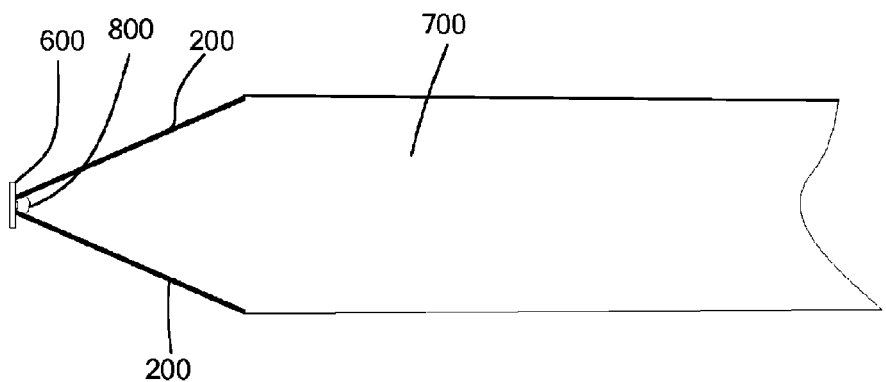
FIG. 6 is a schematic longitudinal sectional view of a backlight module according to a fifth exemplary embodiment of the present invention.
Figure 10:
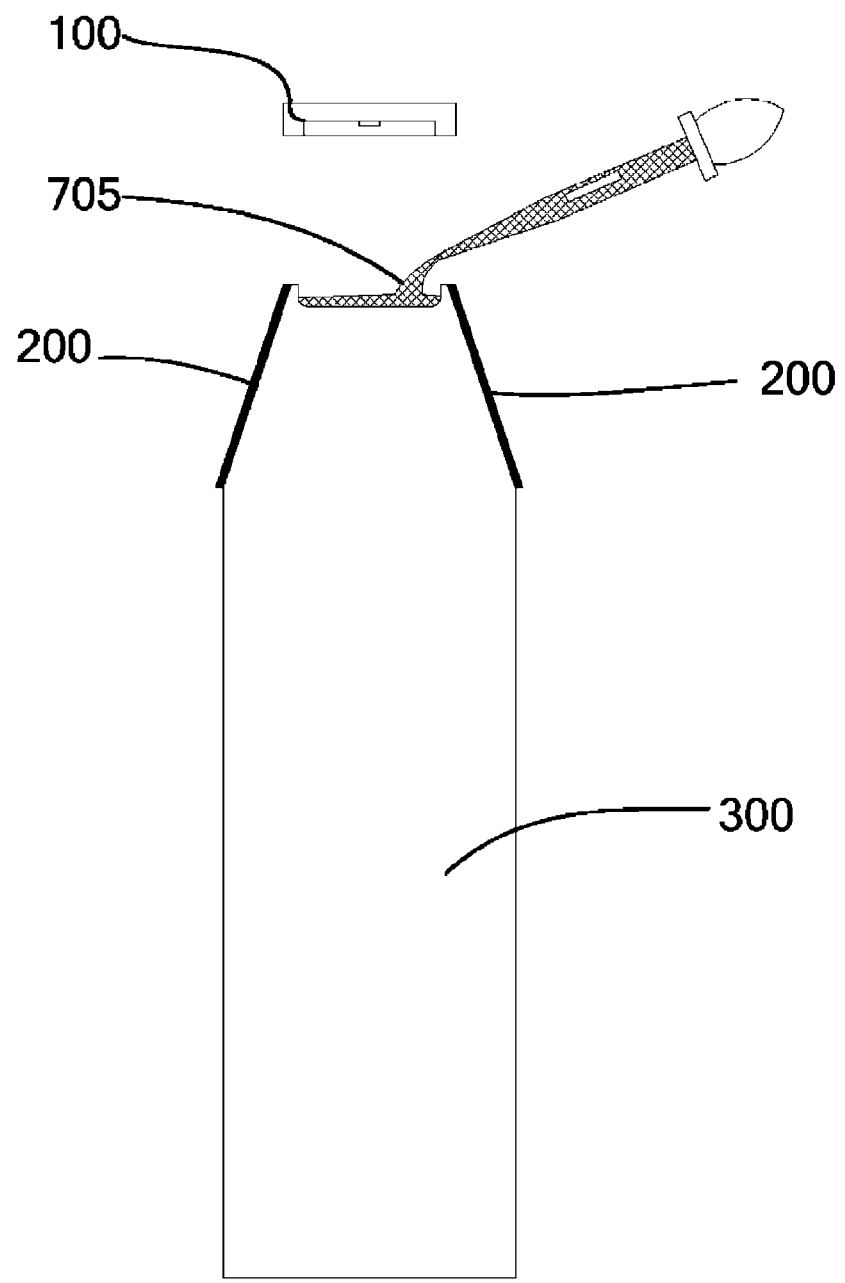
Figure 11:
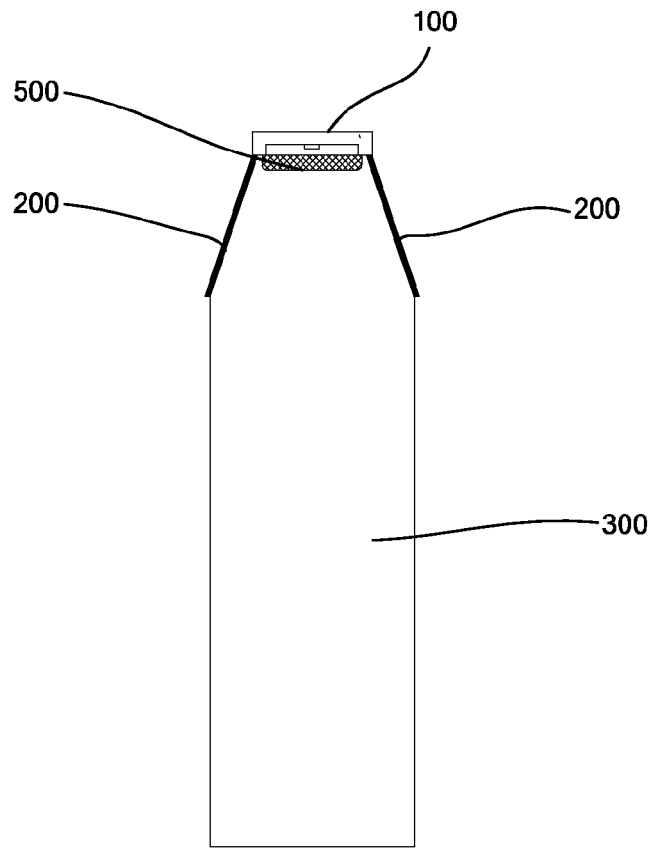

With reference to FIGS. 10 and 11, a notch 706 extending in a width direction of the light guide plate 300 is formed on the incident end face (i.e. the end face facing the LED source 100) of the wedge-shaped light guide portion formed integrally with the light guide plate 300. The silicon gel part is provided in the notch. Further, the light emitting face of the LED source 100 is provided with a fluorescent powder layer thereon. The silicon gel fluorescent powder layer may be made of the mixture of the silicon gel part 800 and the fluorescent powder, which may function as both the silicon gel part and the fluorescent powder layer to directly achieve the optical coupling of the LED source 100 and the light guide plate 300. In addition, as shown in FIG. 6, the LED source 100 may use the blue light LED chip. As the reflective faces of the reflectors 200 have relatively large inclined angles with respect to the top and bottom surfaces of the light guide plate, the light will be propagated at further decreased angle and apt to be parallel in the light guide plate, and thus the light loss may be reduced, improving the optical efficiency.

The reflectors 200 may be formed by adhering the reflective sheets to the top and bottom inclined reflective faces of the wedge-shaped light guide member provided at the incident end of the light guide plate 300. As such, the backlight module is able to prevent the side light leak of the silicon gel fluorescent powder layer 800 to improve the optical efficiency and suppress the light leak and hot spot effects at the incident end of the light guide plate 300. The light with a large emitting angle emitted from the LED source is corrected in direction to enter the light guide plate after it is reflected by the reflective faces of the reflectors such that it can be propagated by total reflection. Further, with the backlight module, the issue that the silicon gel as fluid is difficult to be molded, may be removed by forming the inclined face at the incident end of the light guide plate.

Figure 8:
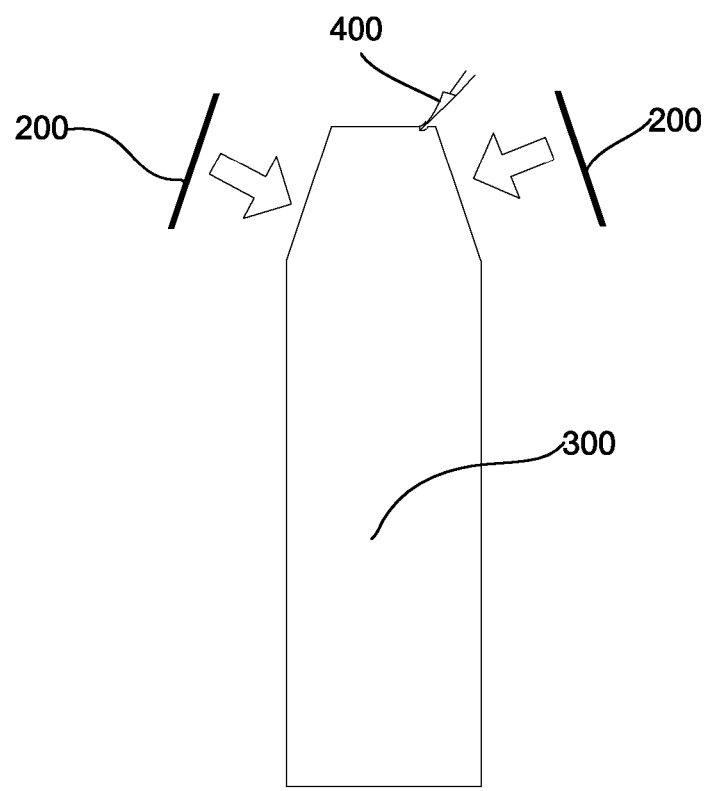
FIGS. 8-11 are schematic views showing an operational process of a method for producing the backlight assemblies shown in FIGS. 5-6.
Figure 9:
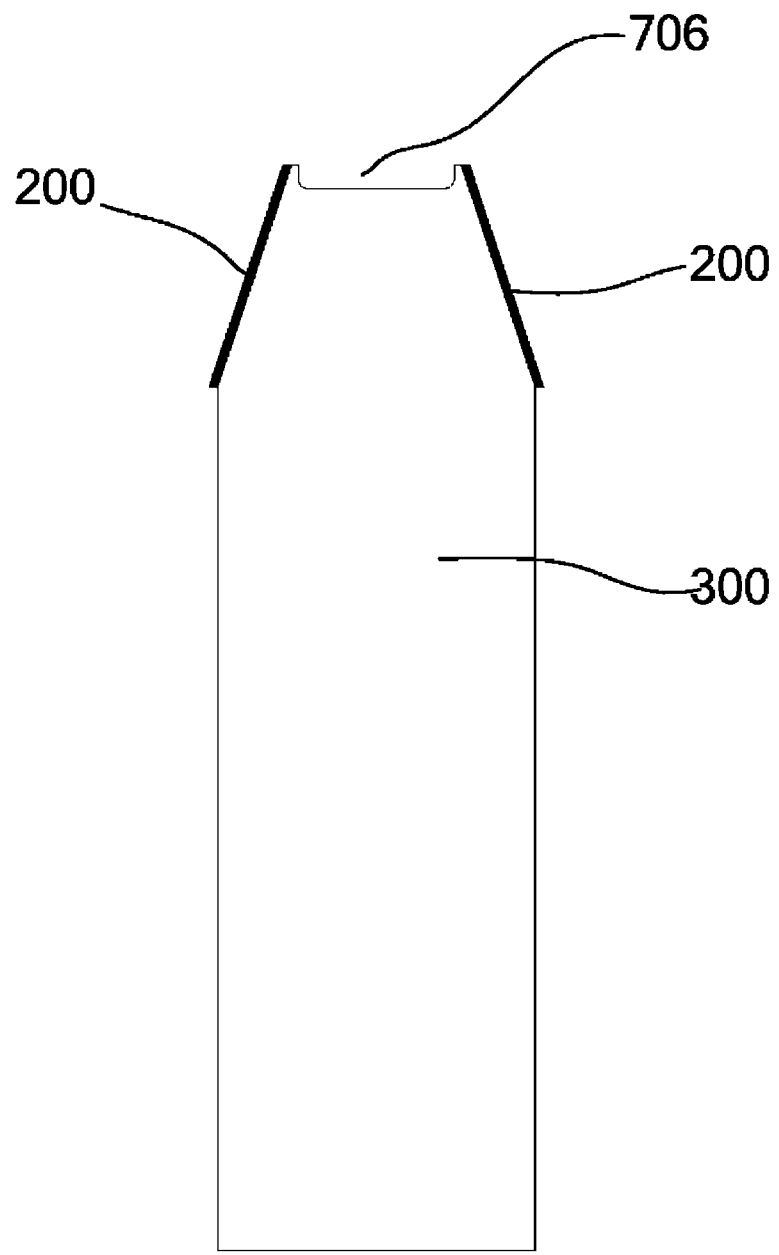

FIGS. 8-11 are schematic views showing an operational process of a method for producing the backlight assemblies shown in FIGS. 5-6. The method for producing the backlight module according to the embodiment comprises steps of:

at first, forming a wedge-shaped light guide portion integrated with the light guide plate from optical conductive material such glass at an incident end of the light guide plate;

as shown in FIG. 8, providing reflectors 200 formed by reflective sheets on two inclined surfaces of the wedge-shaped light guide portion, the reflectors having reflective faces inclined with respect to an upper surface or a lower surface of the light guide plate;

as illustrated in FIG. 9, forming a notch 706 at an incident end face of the wedge-shaped light guide portion, for example, forming the notch 706 at an incident end face of the wedge-shaped light guide portion by cutting;

as shown in FIGS. 10 and 11, forming a silicon gel part 500 by filling the notch 706 with silicon gel 705 in fluid state; finally, mounting a LED source 100 on the silicon gel part 500.

Figure 12:
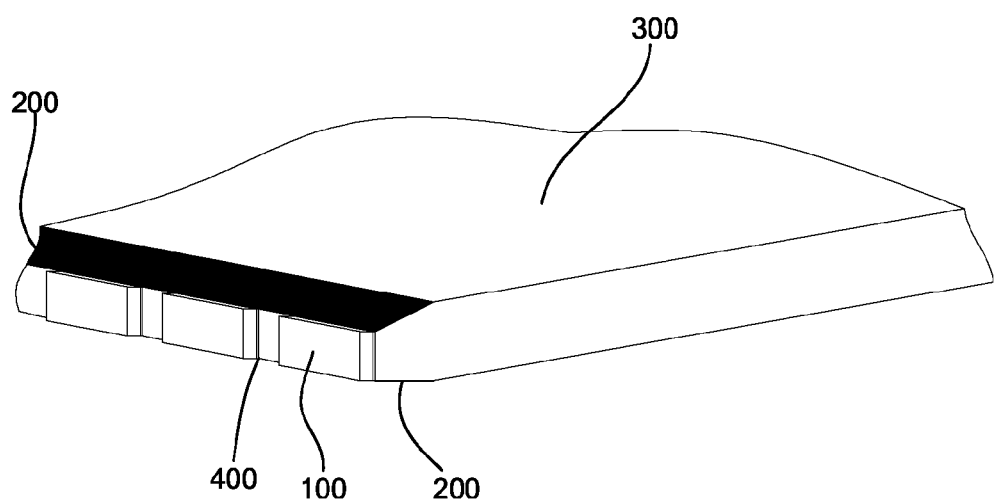
FIG. 12 is a perspective schematic view of a backlight module according to an exemplary embodiment of the present invention.

Further, the LED source 100 may be provided with a fluorescent powder layer 400 on its light emitting face. In particular, as illustrated in FIG. 12, a plurality of notches 706 are formed at the incident end of the wedge-shaped light guide portion. Each of the notches 706 is filled with silicon gel and then a LED source 100 is mounted for each notch 706 to form the backlight module as shown in FIG. 12.

In accordance with an embodiment of a further aspect of the present invention, it provides a display apparatus, for example, a liquid crystal panel, a liquid crystal TV and a cell phone screen, comprising the side type backlight module as described in the above embodiments.

With the backlight module and display apparatus according to the above embodiments of the present invention, by the inclined reflective faces arranged on the top and bottom of the wedge-shaped light guide portion, the light leak for the light emitted from the LED source may be prevented, the optical efficiency may be improved and the light leak and hot spot effects at the light incident end of the light guide plate may be suppressed efficiently. With the fluorescent powder layer added on the light exiting face of the LED source, the blue shift in color will be suppressed, thereby improving the luminance of light. By means of integrally repackaging the LED source, the total reflection at the light emitting face of the LED source may be eliminated, thereby improving the optical efficiency. With the blue light LED chip as the LED source, due to the relatively small volume of the blue light LED chip, the substantial parallel beams may be achieved. By the inclined surfaces formed on the wedge-shaped light guide portion at the incident end of the light guide plate and the reflective sheets mounted on the inclined surfaces, the integral package may be achieved and thus the process will be simplified. With the notch for receiving the silicon gel part provided on the incident end face of the wedge-shaped light guide portion, the silicon gel may be filled efficiently to increase the coupling efficiency of the silicon gel while facilitating the operations of packaging and mounting. In addition, by filling the cavity with silicon gel to form integrally connected the light guide plate and the wedge-shaped light guide portion, the bottom surface of the light guide plate uses the bottom scattering sheets to form uniform backlight illumination and then forms light recycling by bottom reflective sheets, thereby improving the optical efficiency.

Although several exemplary embodiments have been shown and described, the present invention is not limited to those and it would be appreciated by those skilled in the art that various changes or modifications may be made in these embodiments without departing from the principles and spirit of the disclosure. These changes or modifications will also fall within the scope of the present invention. The scope of the present invention is defined in the claims and their equivalents.

What is claimed is:

1. A side type backlight module, comprising:
   a LED source;
   a light guide plate;
   a wedge-shaped light guide portion located between the LED source and the light guide plate;
   two reflectors having reflective faces located on a top and a bottom of the wedge-shaped light guide portion and inclined with respect to an upper surface or a lower surface of the light guide plate, for adjusting the light emitting angle of the LED source; and a silicon gel part located between the LED source and the wedge-shaped light guide portion, wherein a notch extending in a width direction of the light guide plate is provided on a side of the wedge-shaped light guide portion facing the LED source, the silicon gel part being provided in the notch.

2. The side type backlight module according to claim 1, wherein the light guide plate is provided with a top scattering sheet on its top, and the light guide plate is provided with a bottom reflective sheet on its bottom, a bottom scattering sheet being provided on an inner side surface of the bottom reflective sheet, a boundary reflective sheet being provided on the side of the light guide plate opposed to the LED source.

3. The side type backlight module according to claim 1, wherein the wedge-shaped light guide portion and the light guide plate are made in single piece.

4. The side type backlight module according to claim 1, wherein a light emitting face of the LED source is provided with a fluorescent powder layer.

5. The side type backlight module according to claim 4, wherein the fluorescent powder layer is made from yellow fluorescent powder or a mixture of red fluorescent powder and green fluorescent powder.

6. The side type backlight module according to claim 2, wherein the LED source comprises a blue LED chip.

7. The side type backlight module according to claim 6, wherein the blue LED chip is provided with a heat sink on the side opposed to the light guide plate.

8. A display apparatus comprising a side type backlight module, the side type backlight module comprising:
 a LED source;
 a light guide plate;
 a wedge-shaped light guide portion located between the LED source and the light guide plate;
 two reflectors having reflective faces located on a top and a bottom of the wedge-shaped light guide portion and inclined with respect to an upper surface or a lower surface of the light guide plate, for adjusting the light emitting angle of the LED source; and
 a silicon gel part located between the LED source and the wedge-shaped light guide portion,
 wherein a notch extending in a width direction of the light guide plate is provided on a side of the wedge-shaped light guide portion facing the LED source, the silicon gel apart being provided in the notch.

9. The display apparatus according to claim 8, wherein the light guide plate is provided with a top scattering sheet on its top, and the light guide plate is provided with a bottom scattering sheet on its bottom, a bottom scattering sheet being provided on an inner side surface of the bottom scattering sheet, a boundary reflective sheet being provided on the side of the light guide plate opposed to the LED source.

10. The display apparatus according to claim 8, wherein the wedge-shaped light guide portion and the light guide plate are made in single piece.

11. The display apparatus according to claim 8, wherein a light emitting face of the LED source is provided with a fluorescent powder layer.

12. A method for producing a side type backlight module according to claim 1, comprising:
 forming a wedge-shaped light guide portion at an incident end of the light guide plate;
 providing reflectors on two inclined surfaces of the wedge-shaped light guide portion, the reflectors having reflective faces inclined with respect to an upper surface or a lower surface of the light guide plate;
 forming a notch at an incident end face of the wedge-shaped light guide portion;
 forming a silicon gel part by filling the notch with silicon gel; and
 mounting a LED source on the silicon gel part.

\* \* \* \* \*